US011665022B2

United States Patent
Hentz et al.

(10) Patent No.: US 11,665,022 B2
(45) Date of Patent: *May 30, 2023

(54) SEQUENTIAL NODE IDENTIFICATION IN MULTIPLE-COMPARTMENT DISPENSING ENCLOSURES

(71) Applicant: APEX INDUSTRIAL TECHNOLOGIES LLC, Mason, OH (US)

(72) Inventors: Timothy P. Hentz, Erlanger, KY (US); James M. Allen, Batesville, IN (US)

(73) Assignee: APEX INDUSTRIAL TECHNOLOGIES LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,462

(22) Filed: Jun. 29, 2022

(65) Prior Publication Data

US 2022/0393906 A1 Dec. 8, 2022

Related U.S. Application Data

(62) Division of application No. 16/613,844, filed as application No. PCT/US2018/032708 on May 15, 2018, now Pat. No. 11,418,365.

(60) Provisional application No. 62/506,495, filed on May 15, 2017.

(51) Int. Cl.
*H04L 12/417* (2006.01)
*G06F 13/37* (2006.01)
*H04L 12/40* (2006.01)

(52) U.S. Cl.
CPC ............ *H04L 12/417* (2013.01); *G06F 13/37* (2013.01); *H04L 12/40006* (2013.01)

(58) Field of Classification Search
CPC .. H04L 12/417; H04L 12/40006; G06F 13/37
See application file for complete search history.

(56) References Cited

PUBLICATIONS

European Communication Article 94(3) EPC pertaining to EP Application No. EP18 803 164.5 dated Aug. 25, 2022, 5 pages.

*Primary Examiner* — Samina F Choudhry
(74) *Attorney, Agent, or Firm* — Thompson Hine LLP

(57) ABSTRACT

A system for automatically assigning sequential identification values to networked nodes, such as accessory modules within a storage and dispensing enclosure. The system includes a host controller communicating with client controllers via both a shared, multi-drop communications bus and an initial segment of a daisy-chained, point-to-point communications bus. The host controller issues a token to a first client controller via the point-to-point bus, then queries the client controllers, receives a reply from the client controller having the token (associating that controller with a sequential identification value), and commands passing of the token, each via the multi-drop bus. The client controllers receive the token and query via the respective busses and, if that controller has the token, reply to the query via the multi-drop bus, as well as receive the command and, if that controller has the token, pass the token via the point-to-point bus to a subsequent controller.

20 Claims, 7 Drawing Sheets

SEQUENTIAL NODE IDENTIFICATION IN MULTIPLE-COMPARTMENT DISPENSING ENCLOSURES

The present application is directed to storage and dispensing enclosures and, more particularly, to systems and methods in which networked nodes, such as door controls, dispensing modules, or other accessories housed within the enclosure, are automatically assigned a sequential identification value, such as incremented numerical value, without requiring the manual assignment of such values to the individual nodes.

BACKGROUND

Storage and dispensing enclosures may include a plurality of internal compartments for holding items to be dispensed, such as in multi-tiered, locker-like cabinets, and/or a variety of active dispensing units, such as the "pushers" used in some vending machines to dispense individual items, and/or a variety of passive dispensing units that track the presence, withdrawal, and, potentially, return of items, such as in rack-and-bin and bin-in-drawer systems that dispense bulk parts or individual tools (using bulk sensors such as load cells, counting sensors such as break beams, radio frequency identification sensors and radio frequency responsive tags attached to individual items or tools, etc.). The number, size and/or arrangement of the compartments, active dispensing units, and passive dispensing units may vary from enclosure to enclosure based upon an end user's practices and needs. In addition, such enclosures are significant capital equipment, and thus manufacturers have begun to modularize compartment access controls, active dispensing units, and passive dispensing units for such enclosures to allow for customized configuration and, potentially, reconfiguration of individual enclosures.

Such storage and dispensing enclosures require the installation of accessory components that are operatively connected to a controller programmed to, e.g., control the operation of an access door based upon payment or authorization, and/or control the operation of an active dispensing module based upon payment or authorization, and/or monitor a passive dispensing module so to provide an activity/audit trail. Potential accessory components include: compartment access controls such as door locks and door position sensors; motors, solenoids, actuators, and switches for active dispensing units such as the aforementioned pushers; load cells, break beam emitters/detectors, and RFID sensors for passive dispensing units such as the aforementioned bin systems; etc. Accessory components could also include annunciators, cameras, in-compartment environmental sensors, etc. Each of those accessory components would conventionally be wired to a central controller that has been configured to directly operate the accessory components. Alternately, some enclosures may include a master controller configured to indirectly operate such accessory components via networked slave controllers provided in accessory modules. For example, U.S. patent application Ser. No. 14/466,040, published as U.S. Patent App. Pub. 2016/0053514 and incorporated herein by reference in its entirety, discloses modular door assemblies providing door locks, door position sensors, and annunciators (indicator lights) for controlling access to individual compartments within an enclosure, where each modular door assembly is directly controlled by an in-module (slave) microcontroller and indirectly controlled by an in-enclosure (master) controller. However, and particularly in the case of highly customizable enclosures, installing and configuring such accessory modules can still be a complex, time-consuming, and costly process because the networked controllers should be logically associated with a particular compartment or dispenser in a particular location within the enclosure.

SUMMARY

A sequential identification value that has a simple and easily comprehended meaning to a human operator, who could be responsible for the initial configuration of an enclosure, the in-the-field repair of a malfunctioning enclosure, or the reconfiguration of an existing enclosure, would be superior to the complex hardware identifiers fused, burned, or otherwise permanently associated with most networked microcontrollers and networking peripherals. This application discloses a system and method for automatically associating sequential identification values with the complex and generally nonsequential hardware or network address identifiers generally used to address the controllers of networked modules, networked accessories, and other such "nodes."

In a first aspect, disclosed is a system for automatically assigning sequential identification values to a plurality of networked nodes. The system includes a host controller operatively interconnected with a plurality of client controllers by a shared, multi-drop communications bus. The host controller is further operatively interconnected with a first controller of the plurality of client controllers by an initial segment of a daisy-chained, point-to-point communications bus, with each previous controller of the plurality of client controllers being operatively connected to a subsequent controller of the plurality of client controllers by another segment of the point-to-point communications bus. The host controller includes control logic to (i) issue a token to the first of the plurality of client controllers via the initial segment of the point-to-point communications bus, (ii) following issue of the token, query the plurality of client controllers via the multi-drop communications bus, (iii) receive a reply via the multi-drop communications bus and, upon receiving the reply, associate a replying client controller with a sequential identification value, and (iv) command via the multi-drop communications bus passing of the token via the point-to-point communications bus. The client controllers include control logic to (i) receive the token via the point-to-point communications bus, (ii) receive the query via the multi-drop communications bus, (iii) if that controller has the token, issue the reply to the query via the multi-drop communications bus, and (iv) receive the command via the multi-drop communications bus and, if that controller holds the token, pass the token via the point-to-point communications bus to a subsequent controller of the plurality of client controllers.

In a second aspect, disclosed is storage and dispensing enclosure including a host controller and a plurality of accessory modules, each including a respective client controller, disposed within the enclosure. The storage and dispensing enclosure also includes a shared, multi-drop communications bus operatively interconnecting the host controller with the plurality of accessory modules via the respective client controllers. The storage and dispensing enclosure further includes a daisy-chained, point-to-point communications bus operatively interconnecting the host controller with a first of the plurality of accessory modules via an initial segment, and each previous accessory module of the plurality of accessory modules being with each subsequent accessory module of the plurality of accessory modules via additional segments. The host controller includes control logic to (i) issue a token to the first of the plurality of accessory modules via the initial segment of the point-to-point communications bus, (ii) following issue of the token, query the plurality of accessory modules via the multi-drop communications bus, (iii) receive a reply via the multi-drop communications bus and, upon receiving the reply, associate a replying accessory module with a sequential identification value, and (iv) command via the multi-drop communications bus passing of the token via the daisy-chained, point-to-point communications bu. The accessory modules include control logic to (i) receive the token via the point-to-point communications bus, (ii) receive the query via the multi-drop communications bus, (iii) if that accessory module has the token, issue the reply to the query via the multi-drop communications bus, and (iv) receive the command via the multi-drop communications bus and, if that accessory module holds the token, pass the token via the point-to-point communications bus to a subsequent accessory module of the plurality of accessory modules.

DETAILED DESCRIPTION

In certain processing environments, it is desirable to be able to automatically assign simple, sequential identification values to networked client nodes depending upon the order in which they are physically connected to a host node via a linear bus. That ability can be important when functionally random and unique identification numbers such as Globally Unique Identifiers (GUIDs), Media Access Control (MAC) addresses, or the like must be logically associated with a relative physical location within a network or device. An example of such an environment would be a storage and dispensing disclosure, where accessory modules may be installed in various locations within an enclosure frame, and the relative physical location of the accessory module within the enclosure frame is the principal distinguishing characteristic to a human operator configuring or maintaining the device.

In some existing storage and dispensing enclosures, such as vending machines, the physical locations of motor and switch elements can be laid out in a fixed X-Y grid topology that is addressable using fixed row and column wiring. Each element can then be efficiently identified and addressed by well-known column and row addressing methods so long as there is a single input device and/or single output device per node and per-location. That efficiency is lost, however, when complex wiring harnesses begin to be required to support complex input/output requirements for multi-functional modules or nodes, when differently sized accessories begin to be installed in varying locations within an enclosure, and when an enclosure may be configured with different accessories having different input/output requirements. For example, a customer may want a series of enclosures that include four different-sized compartments in two or more different configurations, and where some of the compartments are both access-controlled and environmentally monitored. Grid wiring and fixed wiring harnesses directly connected to a central controller are not well-suited for use in such architectures.

Figure 1:
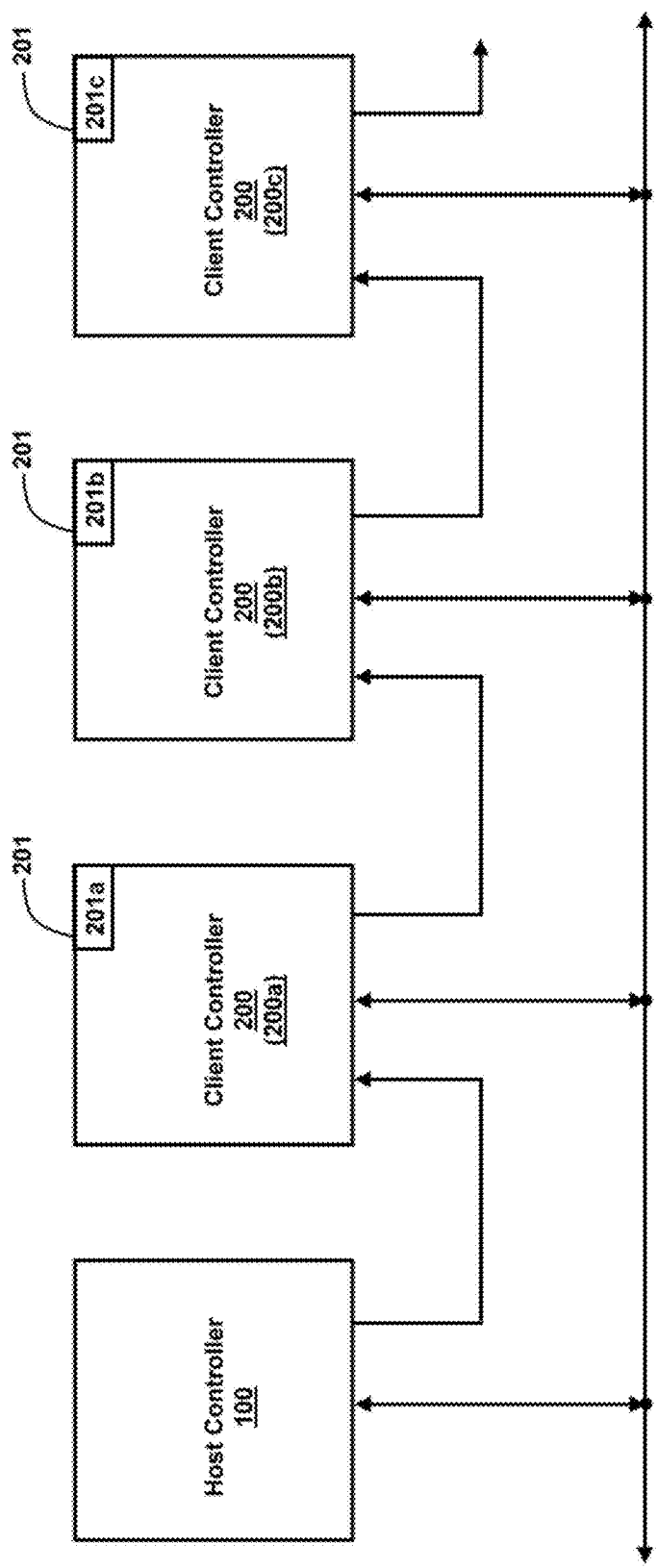
FIG. 1 is a schematic view of a first aspect of a system architecture for a storage and dispensing enclosure.

Accordingly, in a first aspect schematically illustrated in FIG. 1, a storage and dispensing enclosure may include a host controller 100. The host controller 100 includes control logic stored in a memory such as a read-only memory, a non-volatile and re-writeable memory, or a combination thereof. In some constructions, the control logic of the host controller 100 may indirectly control access to compartments in the storage and dispensing unit based upon a payment or an authorization. In some constructions, the control logic of the host controller 100 may indirectly control the operation of active dispensing modules based upon a payment or an authorization. In some constructions, the control logic of the host controller 100 may monitor events communicated by passive dispensing modules so as to record an indication of a dispensing event. Constructions may include any one or more of the foregoing functionalities.

The storage and dispensing enclosure also includes a plurality of client controllers 200, e.g., a first client controller 200a, a second client controller 200b, and a third client controller 200c. Each client controller may have a unique ID 201, e.g., IDs 201a, 201b, and 201c, respectively. The unique ID may be a hardware identifier such as a GUID or a MAC address, or may be an assigned unique ID such as an IP address. The client controllers 200 also include control logic stored in a memory such as a read-only memory, a non-volatile and re-writeable memory, or a combination thereof. For example, a client controller 200 such as controller 200a may, responsive to host controller 100, directly control a door lock so as to control access to a compartment of the storage and dispensing unit. For further example, a client controller such as controller 200b may, responsive to host controller 100, directly control the operation of an active dispensing module, such as a "pusher," so as to dispense an item via the active dispensing module. For yet further example, a client controller 200 such as controller 200c may monitor a passive dispensing module, such as a bin resting upon a load cell, and communicate to host controller 100 a dispensing event when the passive dispensing module senses the removal of an item from the bin.

The host controller 100 is operatively interconnected with the plurality of client controllers 200 by a shared, multi-drop communications bus 300. The multi-drop communications bus 300 may be, for example, an RS-485-compliant bus. The multi-drop communications bus 300 may be, for example, a Controller Area Network (CAN)—specification-compliant bus. Other shared, multi-drop communications bus technologies usable with the system and method will be readily apparent to those skilled on the art.

The host controller 100 is also operatively connected to a first controller of the plurality of client controllers 200 by a segment of daisy-chained, point-to-point communications bus 350. The point-to-point communications bus 350 may be, for example, an RS-422-compliant bus. Other daisy-chainable, point-to-point communications bus technologies usable with the system and method will also be readily apparent to those skilled on the art. The first controller of the plurality of client controllers, e.g., controller 200a, is operatively connected to a second of the plurality of client controllers 200, e.g., controller 200b, by a different segment of the daisy-chained, point-to-point communications bus 350, and so on, so that, in general, each previous controller of the plurality of client controllers 200 is operatively connected to a subsequent controller of the plurality of client controllers 200 by another segment of the daisy-chained, point-to-point communications bus 350. Consequently, the host controller 100 can communicate via the multi-drop communications bus 300 with each of the plurality of client controllers 200, but via the point-to-point communications bus 350 with only the first of the plurality of client controllers 200. The first controller of the plurality of client controllers 200 can communicate via the point-to-point communications bus 350 with only a controller attached to the same segment, and so on. Preferably, each previous controller of the plurality of client controllers 200 can only transmit via the point-to-point communications bus 350 to a subsequent controller of the plurality of client controllers 200.

The host controller 100 includes control logic to issue a token to the first of the plurality of client controllers 200 via the point-to-point communications bus 350. The token may be a simple unique number, a data packet including a token flag or a unique number, or the like. The token is used to control the discovery and identification of the plurality of client controllers 200 via the multi-drop communications bus 300. A client controller 200 that has received and not yet passed on the token may reply to the host controller 100 during commissioning of the system, such as during initial configuration of an enclosure, maintenance involving the replacement of a node in an enclosure, or reconfiguration of the nodes installed in an enclosure. Other client controllers that have passed on the token, i.e., have been discovered and associated with a sequential identification value, or have not yet received the token, i.e., have not yet been discovered and not yet been associated with a sequential identification value, will remain silent. The daisy-chained, point-to-point communications bus 350 and the orderly passing of the token along that bus consequently enables sequential identification values to be associated with the plurality of client controllers 200 based upon the order in which they are physically connected to the host controller 100 via that bus. The point-to-point communications bus 350 may be disposed within the storage and dispensing enclosure in a configuration readily observable by a human operator (e.g., by being visible from the front or rear of the enclosure, potentially after the removal of a fascia, panel, or the like), allowing the operator to observe the sequence in which each node is physically connected to that bus.

The host controller 100 further includes control logic to, following issue of the token, query the plurality of client controllers via the multi-drop communications bus 300. Each of the plurality of client controllers 200 includes control logic to receive the token issued via the point-to-point communications bus 350, to receive the query via the multi-drop communications bus 300, and, if that controller has the token, to reply to the query via the multi-drop communications bus 300. The reply to the query may include the unique ID 201 and/or other information such as the type of module controlled by that client controller 200 and the version of the control logic in that client controller 200.

The host controller 100 further includes control logic to receive the reply via the multi-drop communications bus 300, to associate the replying client controller with a sequential identification value, and to transmit an acknowledgement to the replying client controller via the multi-drop communications bus 300. The host controller may associate the replying client controller with a sequential identification value by associating a replying client controller's unique ID 201 with the sequential identification value. However, if the replying client controller does not have a unique ID 201, the host controller may associate the replying client controller with a sequential identification value by assigning the replying client controller the sequential identification value as a local address on the multi-drop communications bus 300. The acknowledgement may include the associated sequential identification value, which may be stored by the replying client controller within a non-volatile and rewritable memory. The sequential identification value may be used by the replying client controller as its local address on the multi-drop communications bus 300. The sequential identification value may also or alternately be displayed by the node of the replying client controller as a visible indication of the associated sequential identification value at the node. The acknowledgement, whether or not including the associated sequential identification value, may trigger the replying client controller to set an association status flag within a non-volatile and rewritable memory signifying that the controller has been associated with a sequential identification value. The status stored by the association status flag may be displayed by the node as a visible indication of whether the host controller 100 has associated client controller 200 with the sequential identification value. The host controller 100 may subsequently increment a counter to create a subsequent sequential identification value or increment an index to reference a subsequent sequential identification value from a list, array, table, matrix, or other store for a predetermined sequence. The reader will appreciate that the sequential identification value could be a numerical value (e.g., 1, 2, 3 . . . ), an alphanumerical value (e.g., value from a hexadecimal sequence), or a value from a predetermined sequence (for sake of illustration, "first," "second," "third" . . . ).

The host controller 100 yet further includes control logic to command via the multi-drop communications bus 300 passing of the token (e.g., transmits a broadcast command to all client controllers 200 for any having the token to pass the token to a subsequent client controller), and each of the plurality of client controllers 200 further includes control logic to receive the command via the multi-drop communications bus 300 and, if it holds the token, pass the token via the point-to-point communications bus 350 to a subsequent controller of the plurality of client controllers 200.

After issuing the command over the multi-drop communication bus 300, the host controller control logic iterates the querying, receiving, associating, transmitting, and commanding logic until the last of the plurality of client controllers 200 is identified and associated or a fault occurs. The host controller 100 may assume completion of the commissioning (identification and association) process if a reply is not received within a timeout. Alternately, the last of the plurality of client controllers 200 may send an end-of-bus, negative acknowledgement, or similar message if it has the token and is commanded to pass the token, if the point-to-point communications bus 350 has a connection-sensing capability. Faults may be indicated by the aforementioned display of the node. For example, an alphanumeric display may display a character indicating whether the client controller of the node is in commissioning mode (awaiting receipt of the token) or has been identified and associated (has received and passed on the token). Such a display may also indicate whether a node has the token, which may be useful for identifying a faulty connection between that client controller 200 and the multi-drop communications bus 300. An alternate, multiple position or multiple color LED display may illuminate particular LEDs or illuminate particular colors to provide the same indications.

Figure 2:
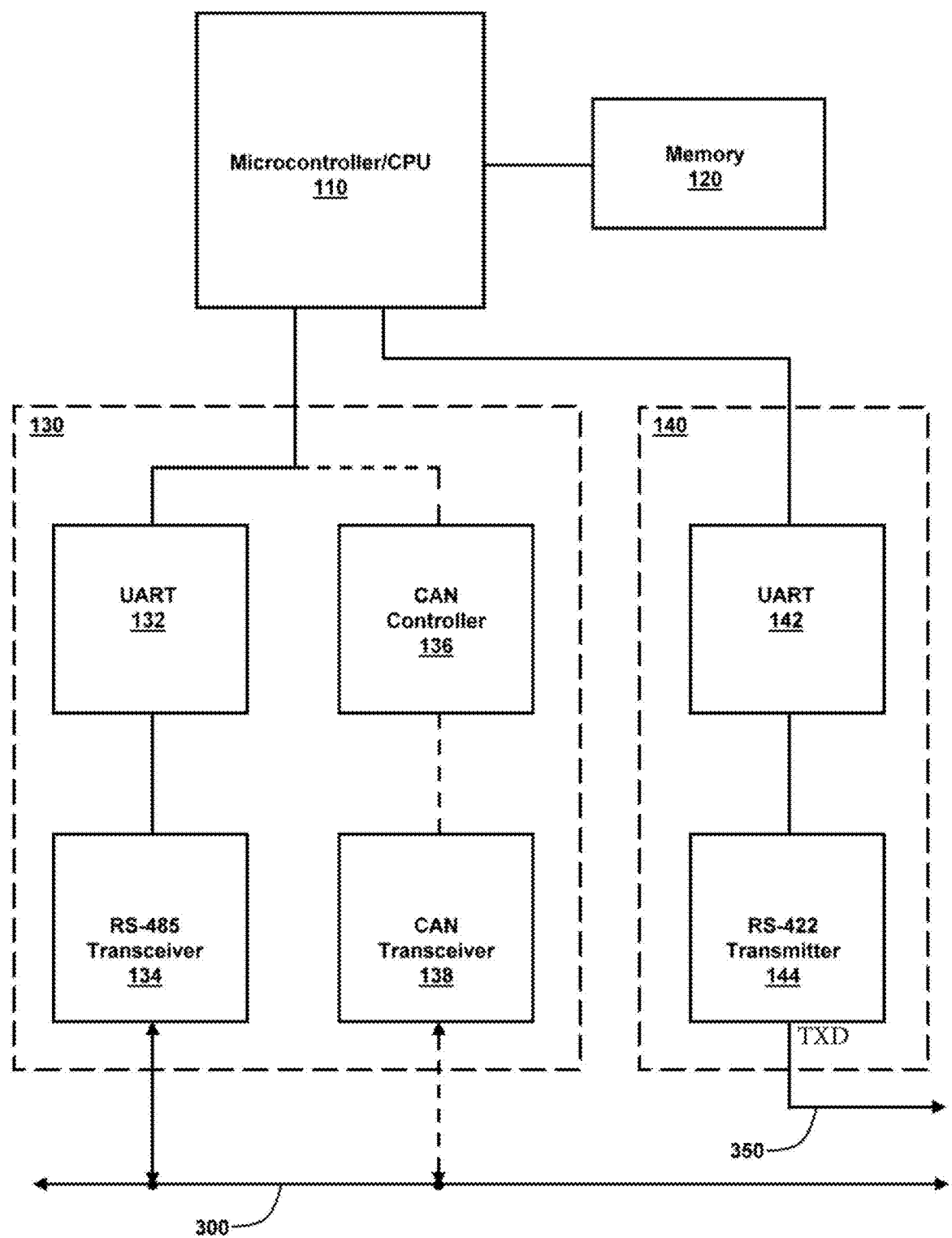
FIG. 2 is a schematic view of an exemplary host or master controller for use with the system architecture shown in FIG. 1.

Turning to FIG. 2, an exemplary host controller 100 may comprise a microcontroller or central processing unit 110, a memory 120, a first bus interface 130 to the multi-drop communications bus 300, and a second bus interface 140 to the point-to-point communications bus 350. The memory 120 is preferably non-volatile and rewriteable (so as to serve as a repository for upgradable control logic and the association information described above), but may be volatile random access memory paired with firmware. In one construction, the first bus interface 130 includes a universal asynchronous receiver/transmitter (UART) 132 and an RS-485-compliant transceiver 134. In another construction, the bus interface 130 includes a CAN controller 136 and CAN transceiver 138 (alternate operative connections shown using broken lines). In the illustrated constructions, the second bus interface 140 includes a second universal asynchronous receiver/transmitter (UART) 142 and an RS-422-compliant transmitter 144. It will be appreciated that in other constructions, the transmitter could be a transceiver and the bus interface may not require a UART.

Figure 3:
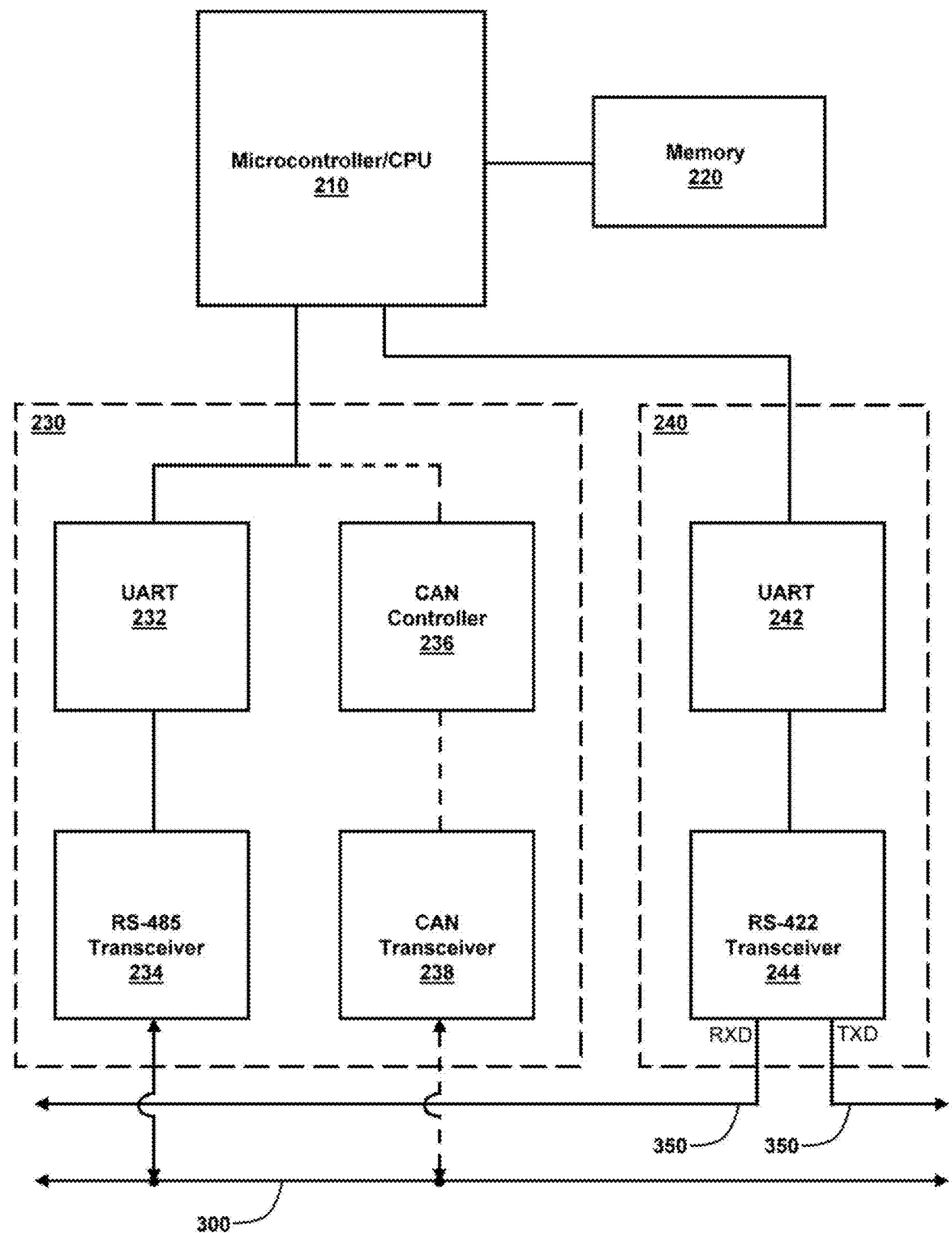
FIG. 3 is a schematic view of an exemplary client or slave controller for use with the system architecture shown in FIG. 1.

Turning to FIG. 3, an exemplary client controller 200 may comprise a microcontroller or central processing unit 210, a memory 220, a first bus interface 230 to the multi-drop communications bus 300, and a second bus interface 240 to the point-to-point communications bus 350. The memory 220 is again preferably non-volatile and rewriteable (so as to serve as a repository for upgradable control logic and the association information described above), but may be volatile random access memory paired with firmware. In one construction, the first bus interface 230 includes a universal asynchronous receiver/transmitter (UART) 232 and an RS-485-compliant transceiver 234. In another construction, the bus interface 230 includes a CAN controller 236 and CAN transceiver 238 (alternate operative connections shown using broken lines). In the illustrated construction, the second bus interface 240 includes a second universal asynchronous receiver/transmitter (UART) 242 and at least one RS-422-compliant transceiver 244. In the illustrated construction, a single RS-422-compliant transceiver receives from a prior segment of the point-to-point communications bus 350 and transmits to a subsequent segment of that bus so that communication through the bus 350 is one-directional. It will be appreciated that in other constructions, a transceiver may provide bidirectional communications, there may be paired transceivers to connect to the previous and subsequent segments, and the bus interface may require other UARTs or controllers.

Figure 4:
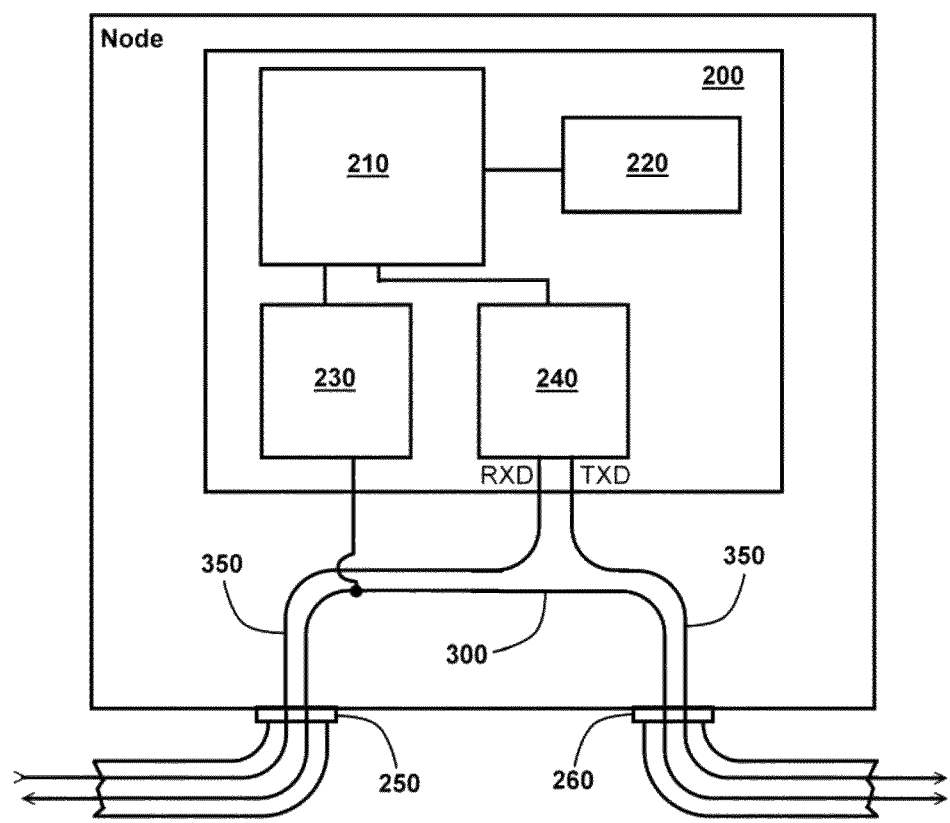
FIG. 4 is a schematic view of an exemplary physical architecture for a storage and dispensing enclosure.

Turning to FIG. 4, a preferred physical construction of the system combines the multi-drop communications bus and point-to-point communications bus in twisted pair cabling (e.g., "category 5" or ANSI/TIA/EIA-568-A cabling; used pairs are shown as single lines for clarity of illustration). The multi-drop communication bus 300 is continuous between input 250 and output 260 ports of each client controller 200/node, with a drop connecting to the first bus interface 230 of the node, so that a first wire pair of the cabling forms an uninterrupted bus segment across all connected controllers 100, 200. The point-to-point communication bus 350 is interrupted by the second bus interface of the node so that another wire pair, or single wire in one-way implementations of the bus, forms a daisy-chain of interrupted bus segments across all connected controllers 100, 200. Accordingly, a linear bus having an arbitrary shape and length can be formed by daisy-chaining controllers 100, 200 of the nodes using readily available structured cabling.

Figure 5:
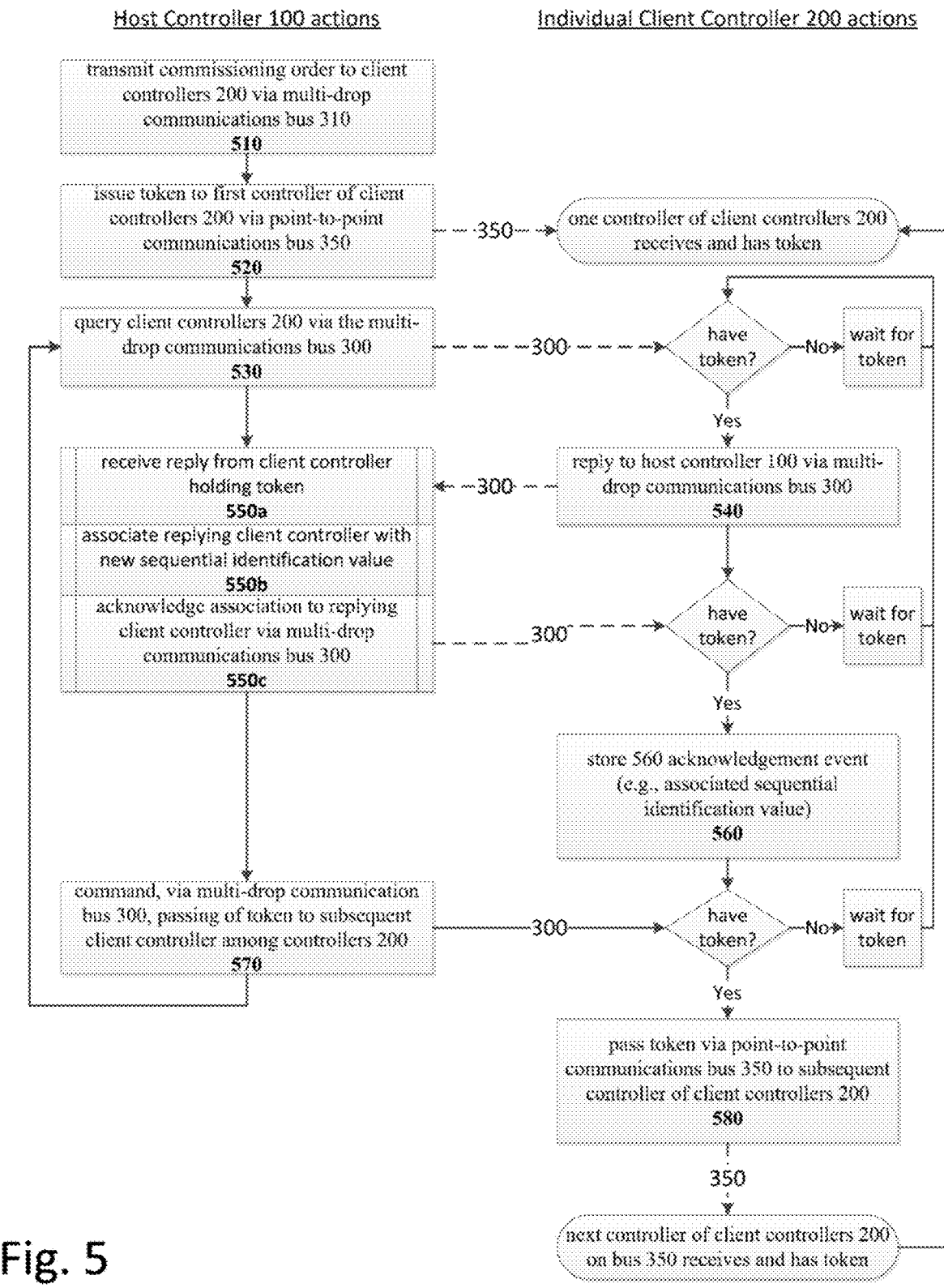
FIG. 5 is a block diagram illustrating a method of identifying and assigning sequential identification values to client controllers in one or more storage and dispensing enclosures.

FIG. 5 summarizes a method 500 reflecting the control logic described above. In a system including a host controller 100 and a plurality of client controllers 200, with the host controller 100 operatively connected to the plurality of client controllers 200 via a multi-drop communications bus 300, the host controller 100 operatively connected to a first controller of the plurality of client controllers 200 via a segment of a point-to-point communications bus, and each previous controller of the plurality of client controllers 200 operatively connected to a subsequent controller of the plurality of client controllers 200 via another segment of the point-to-point communications bus 350, a host controller 100 may transmit a commissioning order 510 to a plurality of client controllers 200 via the multi-drop communications bus 310. Such a commissioning order may trigger the plurality of client controllers 200 to cease transmitting on the multi-drop communications bus, to discard any stored sequential identification value and/or reset any association status flag, and to enter a commissioning mode. The reader will appreciate that this step is considered optional, since a host controller 100 and plurality of client controllers 200 may be manually placed into a commissioning mode or ordered to enter a commissioning mode by other means.

The host controller 100 issues a token 520 to a first controller of the plurality of client controllers via the point-to-point communications bus 350. The host controller 100 queries 530 the plurality of client controllers 200 via the multi-drop communications bus 300. A client controller receiving the query and having the token replies 540 to the host controller 100 via the multi-drop communications bus 300. The host controller 100 receives 550a the reply, associates 550b the replying client controller with a sequential identification value, and acknowledges 550c the association to the replying client controller via the multi-drop communications bus 300. The replying client controller, receiving the acknowledgement and having the token, stores 560 the acknowledgement event. The storage may include storing an associated sequential identification value, setting an association status flag, or a combination of the foregoing. The host controller 100 and replying client controller may optionally use an associated sequential identification value as a local address 565 of the replying client controller on the multi-drop communications bus 300, such as when the plurality of client controllers 200 includes client controllers that do not include a pre-assigned unique ID.

The host controller 100 commands 570 via the multi-drop communication bus 300 passing of the token. The replying client controller, receiving the command and having the token, passes the token 580 via the point-to-point communications bus 350 to a subsequent client controller of the plurality of client controllers. Then, the steps 520 through 580 are repeated. The reader will appreciate that there may be variations of and additional steps in the method reflecting the options and alternatives described for the control logic above.

The system and method advantageously establish a sequential identification value that has a simple and easily comprehended meaning to a human operator, who could be responsible for the initial configuration of an enclosure, the in-the-field repair of a malfunctioning enclosure, or the reconfiguration of an existing enclosure. This logical sequential identification value may be used for addressing client controllers on the multi-drop communications bus 300, but even more importantly may be used by a human operator to, for example, identify to the host controller 100, or any computer executing payment, authentication, and/or stock tracking software, the items that have been stocked in a particular compartment, active dispensing unit, or passive dispensing unit. Other uses for the sequential identification value will be apparent to those working in the art. In contrast to prior systems and methods, no unique parameters must be loaded when compiling controller control logic or manually programmed during initial configuration of an enclosure. Once commissioning has been completed, the multi-drop communications bus 300 enables operation even when single or multiple nodes have failed, while during commissioning the association of sequential identification values and potential for display of commissioning status (potentially by display of association status or the associated sequential identification value itself at each node) enables ready identification of faulty nodes, defective cabling segments and the like. Finally, the system and method simply in-the-field replacement of nodes or reconfiguration of an enclosure. The nodes may be interconnected using inexpensive structured cabling by technically savvy but relatively untrained operators, so that in-the-field replacements may be performed by non-specialized field service technicians and, potentially, an end user's own technical staff.

Structured Cabling Serialization

In another aspect, a system architecture for a storage and dispensing enclosure with complex input/output requirements is disclosed.

Figure 6:
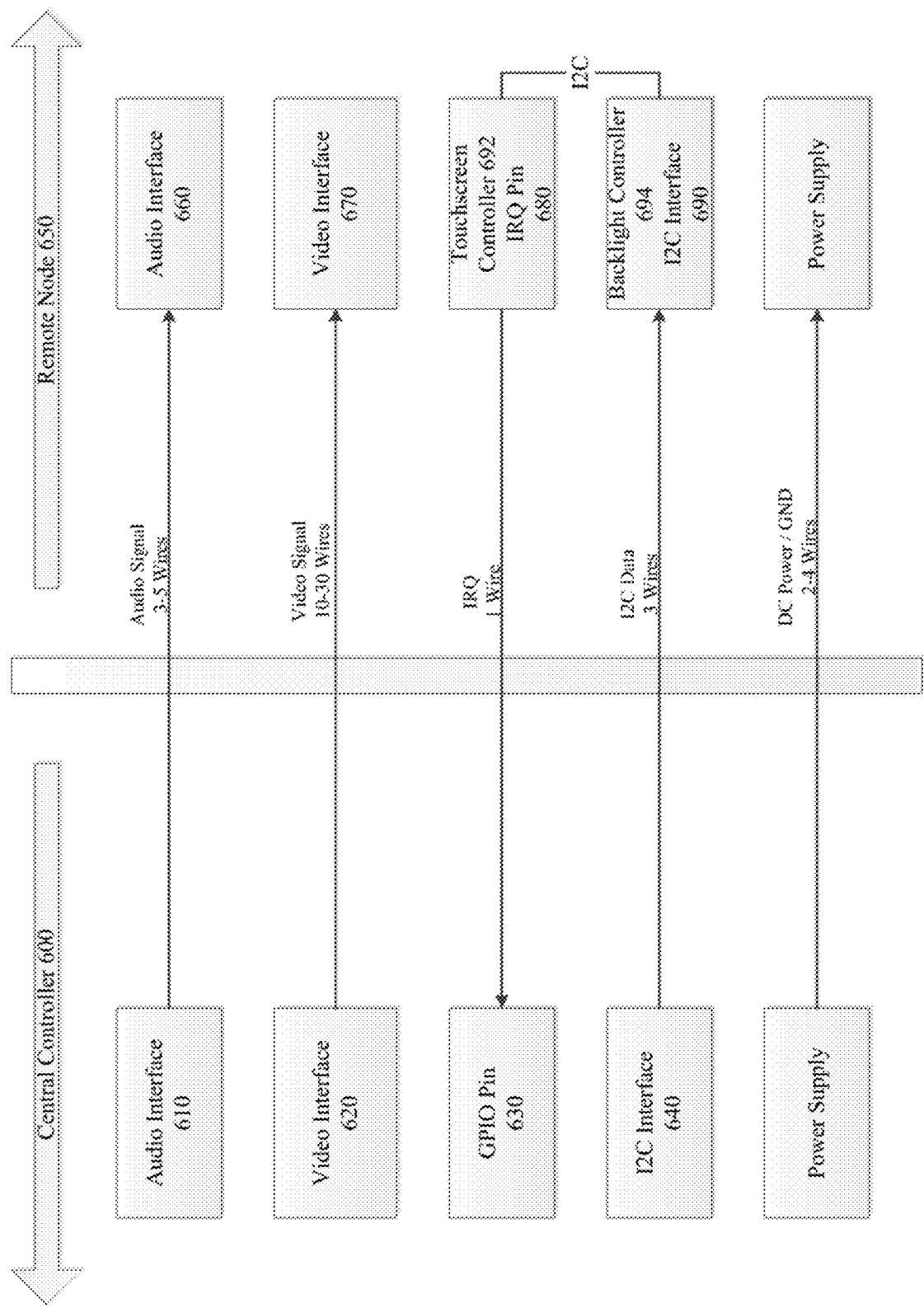
FIG. 6 is an illustration of a prior art system architecture for point-to-point data communications, for an exemplary touchscreen video node, in a storage and dispensing enclosure.

FIG. 6 illustrates a prior art system architecture in which a remote node is directly controlled by a central controller 600. The exemplary remote node 650 is a touchscreen video interface that illustrates the variety of input/output interfaces and types that may be required. The remote node 650 includes audio interface 660 for receiving a digital audio signal, such as an I2S interface, a video interface 670 for receiving a digital video signal, such as an LVDS, HDMI, or Displayport interface, and an IRQ pin 680 and I2C interface 690 for a touchscreen controller 692, with additional use of the I2C interface for a video screen backlight controller 694. The central controller 600, which may be a so-called embedded personal computer, correspondingly includes an audio interface 610, such as an I2S interface, a video interface 670 for transmitting a digital video signal, such as an HDMI or Displayport interface, GPIO pin 630 for receiving the output of the touchscreen controller IRQ pin, and I2C interface 640 connection to the I2C interface 690. Each wiring connection between corresponding interfaces requires cables including at least one and potentially up to 30 wires. Such wiring can be costly and difficult to route within complex and cramped storage and dispensing enclosures, particularly if longer lengths are required.

Figure 7:
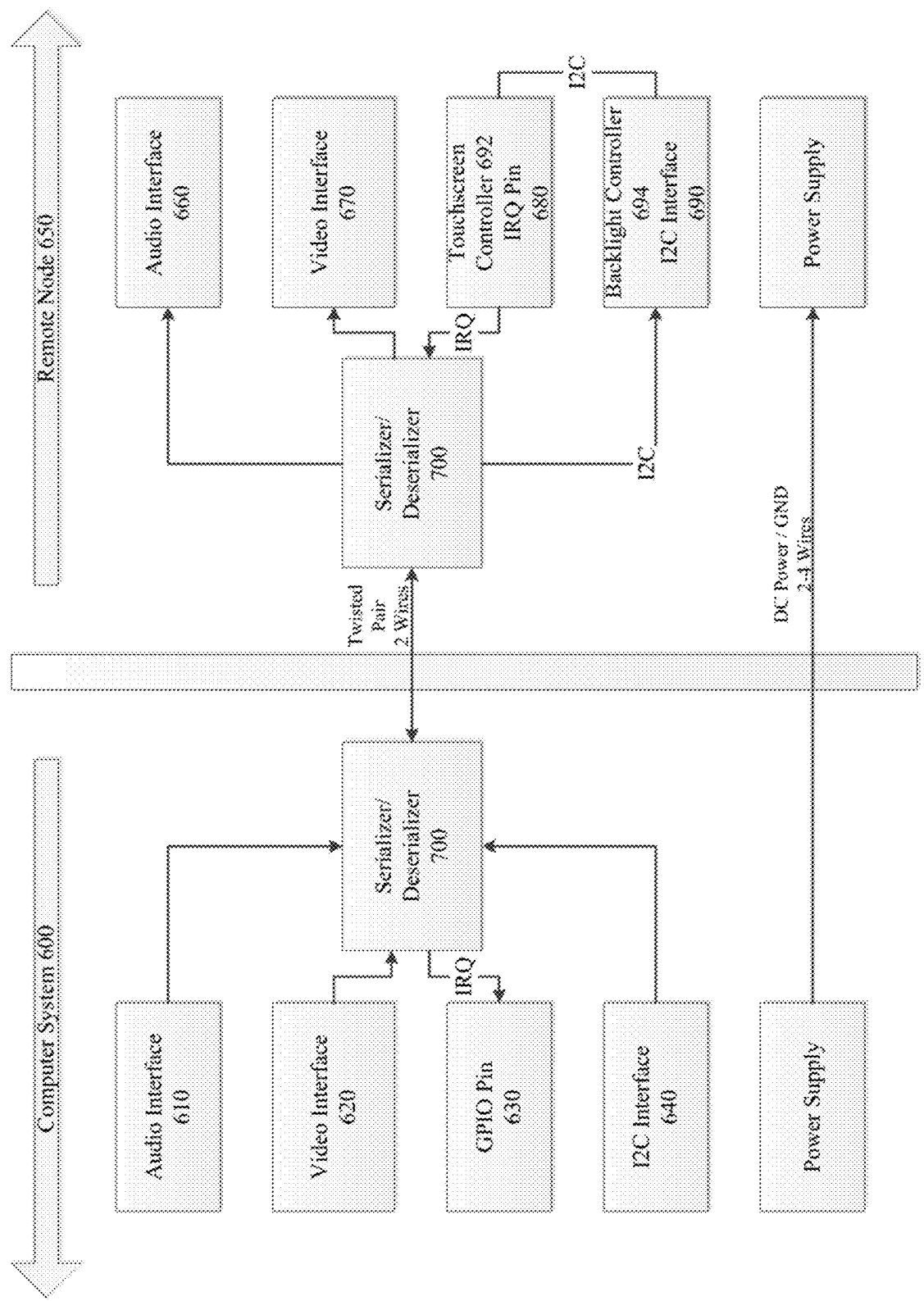
FIG. 7 is an illustration of a second aspect of a system architecture for a storage and dispensing enclosure that employs serialization within high speed structured cabling for point-to-point communications.

FIG. 7 shows a system architecture in which the central controller 600 includes a plurality of digital interfaces, e.g., the audio interface 610, video interface 620, GPIO pin 630 and I2C interface 640, connected to a first serializer/deserializer 700 local to the central controller. Correspondingly, the remote node 650 includes a plurality of digital interfaces connected to a second serializer/deserializer 750 local to the remote node. The first and second serializer/deserializers are interconnected by a single cable 710 which may include as few as two wires. The comparatively low data rate audio signal between audio interfaces 610 and 660, the comparatively high data rate video signal between video interfaces 620 and 670, and the other signals between interfaces 630 and 640 and 680 and 690, respectively, are serialized into a single high data rate signal for transmission within cable 710 between the central controller 600 and remote node 650. Such a cable 710 may be twisted pair cabling (e.g., "category 5" or ANSI/TIA/EIA-568-A cabling, "category 6" or ANSI/TIA-568-C.1 cabling, or other high speed structured cabling, including shielded twisted pair cabling). This advantageously substantially reduces the cost, bulk, and routing complexity of prior, interface-specific point-to-point cabling within such systems.

Although the invention is shown and described with respect to certain embodiments and constructions, it should be clear that modifications will occur to those skilled in the art upon reading and understanding the specification, and the present invention includes all such modifications.

What is claimed is:

1. A method for automatically assigning sequential identification values to a plurality of networked nodes including a host controller operatively interconnected with a plurality of client controllers by a shared, multi-drop communications bus, the host controller being further operatively interconnected with a first controller of the plurality of client controllers by an initial segment of a daisy-chained, point-to-point communications bus, and each previous controller of the plurality of client controllers being operatively connected to a subsequent controller of the plurality of client controllers by another segment of the point-to-point communications bus, the method comprising the steps of:

issuing, via the host controller, a token to a first controller of the plurality of client controllers via the point-to-point communications bus;

querying, via the host controller, the plurality of client controllers via the multi-drop communications bus, and receiving, via the host controller, from a client controller having the token, a reply via the multi-drop communications bus;

associating, via the host controller, the replying client controller with a sequential identification value;

acknowledging, via the host controller, the association to the replying client controller via the multi-drop communications bus;

commanding, via the host controller and multi-drop communications bus, passing of the token to a subsequent controller of the plurality of client controllers via the point-to-point communications bus; and repeating the querying, associating, acknowledging, and commanding steps.

2. The method of claim 1, further comprising, prior to the issuing step, the step of:

transmitting a commissioning order to the plurality of client controllers via the multi-drop communications bus so as to trigger the plurality of client controllers to enter a commissioning mode.

3. The method of claim 1, wherein the associating step comprises associating a unique identifier of the replying client controller with the sequential identification value.

4. The method of claim 3, wherein the unique identifier of replying client controllers are generally non-sequential.

5. The method of claim 1, wherein the acknowledging step comprises transmitting the associated sequential identification value to the replying client controller.

6. The method of claim 1, wherein the repeating step comprises repeating the querying, associating, acknowledging, and commanding steps until a reply is not received within a timeout period.

7. The method of claim 1, wherein the repeating step comprises repeating the querying, associating, acknowledging, and commanding steps until the reply includes a message indicative of the end of the point-to-point communications bus.

8. The method of claim 1, wherein the sequential identification value is a numerical value, an alphanumerical value, or a value from a predetermined sequence.

9. A method for automatically assigning sequential identification values to a plurality of networked nodes including a host controller operatively interconnected with a plurality of client controllers by a shared, multi-drop communications bus, the host controller being further operatively interconnected with a first controller of the plurality of client controllers by an initial segment of a daisy-chained, point-to-point communications bus, and each previous controller of the plurality of client controllers being operatively connected to a subsequent controller of the plurality of client controllers by another segment of the point-to-point communications bus, the method comprising the steps of:
receiving a token, via a controller of the plurality of client controllers, via the point-to-point communications bus;
receiving a query, via the said controller of the plurality of client controllers, via the multi-drop communications bus;
replying to the query, via the said controller and the multi-drop communications bus, if the said controller has the token;
receiving and storing an acknowledgement, at the said controller, that the reply to the query has been received by the host controller;
receiving a command, via the said controller and the multi-drop communications bus, to pass the token; and
after receiving the command, passing the token, via the said controller and the point-to-point communications bus, to a subsequent controller of the plurality of client controllers.

10. The method of claim 9, wherein the said controller of the plurality of client controllers has a unique identifier, and the reply to the query includes the unique identifier.

11. The method of claim 10, wherein the unique identifiers of the plurality of client controllers are generally non-sequential.

12. The method of claim 11, wherein the unique identifier is an Internet Protocol address.

13. The method of claim 9, further comprising the step of entering, via the said client controller after receiving a commissioning order via the multi-drop wireless communications bus, a commissioning mode.

14. The method of claim 13, wherein entering the commissioning mode includes a cessation of transmissions by the said client controller on the multi-drop communications bus, and discarding any stored sequential identification value and/or resetting any association status flag used by the said client controller.

15. The method of claim 9, wherein receiving and storing the acknowledgement includes storing an associated sequential identification value, setting an association status flag, or a combination of the foregoing, in the said client controller.

16. The method of claim 15, wherein the associated sequential identification value is used as a local address of the said client controller on the multi-drop communications bus.

17. The method of claim 9, further comprising the steps of sensing that the said client controller is a last of the plurality of client controllers along the point-to-point communications bus and, after receiving the command, sending a message indicative of the end of the point-to-point communications bus via the said client controller and the multi-drop communications bus.

18. The method of claim 9, further comprising the step of displaying, via the said client controller, an indication that the said client controller is awaiting receipt of the token or that the said client controller has been identified and associated with a sequential identification value.

19. The method of claim 18, wherein the indication that the said client controller has been identified and associated with a sequential identification value includes the sequential identification value.

20. The method of claim 9, further comprising the step of displaying, via the said client controller, that the said client controller has the token.

* * * * *